No. 686,171. Patented Nov. 5, 1901.
J. M. WATERS.
AGRICULTURAL IMPLEMENT.
(Application filed June 22, 1901.)
(No Model.)
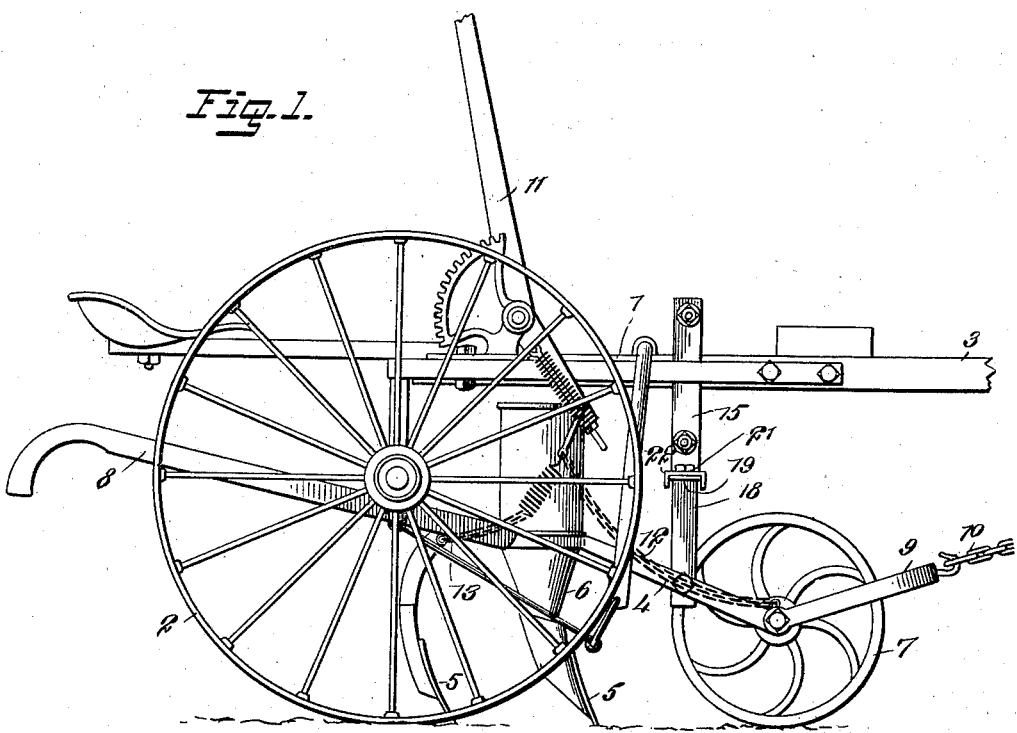
WITNESSES:
INVENTOR
James M. Waters
BY
ATTORNEYS

UNITED STATES PATENT OFFICE.

JAMES M. WATERS, OF FORNEY, TEXAS, ASSIGNOR TO JAMES M. WATERS AND WILLIS B. WADE, OF FORNEY, TEXAS.

AGRICULTURAL IMPLEMENT.

SPECIFICATION forming part of Letters Patent No. 686,171, dated November 5, 1901.

Application filed June 22, 1901. Serial No. 65,611. (No model.)

*To all whom it may concern:*

Be it known that I, JAMES M. WATERS, a citizen of the United States, and a resident of Forney, in the county of Kaufman and State of Texas, have invented a new and Improved Agricultural Implement, of which the following is a full, clear, and exact description.

This invention relates particularly to attachments for planters, cultivators, and the like; and the object is to provide an attachment whereby the implement will be permitted to yield to uneven ground, thus causing the plows or points to form rows of even depth from one end to the other.

I will describe an agricultural implement embodying my invention, and then point out the novel features in the appended claims.

Reference is to be had to the accompanying drawings, forming a part of this specification, in which similar characters of reference indicate corresponding parts in all the figures.

Figure 1 is a side elevation of an agricultural implement, showing an attachment embodying my invention as applied thereto. Fig. 2 is a perspective view of the attachment. Fig. 3 is a section on the line $x\ x$ of Fig. 2, and Fig. 4 is a section on the line $y\ y$ of Fig. 2.

In the drawings I have shown a planter; but it is to be understood that my invention may be employed in connection with drills, cultivators, and the like.

Referring to the drawings, 1 designates a frame supported by the rear traction-wheels 2 and from which the tongue 3 extends. Arranged below the frame 1 and movable vertically with relation thereto is the frame 4 for supporting the plows or points 5 in the usual manner, and also supported in this frame is the seedbox 6. Attached to the forward portion of the frame 4 is the front wheel 7, and extended rearwardly from the frame are the handles 8. From a clip 9, attached to the axle of the wheel 7, a chain 10 extends to a connection with the tongue 3 near its forward end or at any suitable point. The frame 4 may be raised or lowered when turning at the end of a row or when the machine is not desired for use by means of levers 11, placed one at each side of the frame 1, and from these levers chains 12 and 13 extend downward to connect with the frame.

The attachment consists of a hanger comprising side plates 14 and 15, designed to engage against the opposite sides of the tongue 3, and these side plates are connected at the top by a cross-bar 16 and near the lower portion by means of a cross-bar 17. The distance between the cross-bars 16 and 17 is sufficient to permit of a considerable vertical movement of the attachment relatively to the tongue. Downwardly-extended side members 18 are designed for connection with the side members of the frame 4, and to permit of the device being attached to different sizes of implements or different widths between the frame members 4 these members 18 are outwardly and inwardly adjustable. As here shown, the side plates 14 and 15 have horizontally-extended lower portions 19, and the members 18 have inwardly and horizontally disposed upper portions 20, designed to slide upon the portions 19. These portions 19 and 20 are longitudinally slotted, and through the slots set-bolts 21 extend. These set-bolts, as here shown, pass through openings in clips or plates 22, which engage over the top surface of the portions 19 and have their ends turned downward to engage against the edges of the portions 19 and 20. By this arrangement it is obvious that while the implement is passing over uneven ground the wheel 7 will rise or fall, causing a corresponding movement of the plows or points 5 and the drill or seeder point or points.

Having thus described my invention, I claim as new and desire to secure by Letters Patent—

1. In an agricultural implement, a frame, a plow or point supporting frame movable vertically with relation to the first-named frame, a wheel at the forward end of the movable frame, and an attachment having connection with the members of the movable frame and having sliding connection relatively to the upper frame, substantially as specified.

2. In an agricultural implement, a main frame, a plow or point supporting frame movable vertically under the main frame, a wheel journaled in the front portion of the movable frame, a tongue extended from the main frame, an attachment consisting of side plates adapted to engage the opposite sides of the tongue, the said side plates being connected at the top and near the lower end, and downwardly-extended members adapted for connection with the side members of the movable frame, substantially as specified.

3. In an agricultural implement, a main frame, comprising a tongue, a vertically-movable frame under the main frame, a wheel supported in the forward portion of the movable frame, side plates adapted to engage opposite sides of the tongue, said side plates being connected at the top and near the bottom, and downwardly-extended members having adjustable connection with said side plates and adapted for connection with the side members of the movable frame, substantially as specified.

4. In an agricultural implement, a device for attaching a movable frame with a main frame to permit of a sliding movement of the movable frame relatively to the main frame, consisting of side plates connected together at the top and near the bottom, outwardly-extended portions at the lower ends of the side plates and provided with slots, downwardly-extended members adapted for engagement with the movable frame, the said downwardly-extended members having inwardly-extended upper ends provided with slots, and clamping-bolts extended through the slots of the connecting members or portions, substantially as specified.

In testimony whereof I have signed my name to this specification in the presence of two subscribing witnesses.

JAMES M. WATERS.

Witnesses:
 WILEY BALL,
 W. D. ADAMS.